US011892128B2

(12) United States Patent
Rosenbauer et al.

(10) Patent No.: US 11,892,128 B2
(45) Date of Patent: Feb. 6, 2024

(54) ILLUMINATION DEVICE WITH LEADFRAME

(71) Applicant: LEDVANCE GmbH, Garching bei Munich (DE)

(72) Inventors: Georg Rosenbauer, Wassertrüdingen (DE); Christoph Krieglmeyer, Hitzhofen/Hofstetten (DE); Dominik Tiefel, Eichstätt (DE)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 16/654,617

(22) Filed: Oct. 16, 2019

(65) Prior Publication Data

US 2020/0158297 A1 May 21, 2020

(30) Foreign Application Priority Data

Oct. 16, 2018 (DE) ......................... 202018105898.3

(51) Int. Cl.
*F21K 9/275* (2016.01)
*F21S 4/28* (2016.01)
(Continued)

(52) U.S. Cl.
CPC ................ *F21K 9/275* (2016.08); *F21S 4/28* (2016.01); *F21V 21/088* (2013.01); *F21Y 2115/10* (2016.08)

(58) Field of Classification Search
CPC ... F21K 9/275; F21K 9/69; F21K 9/27; F21K 9/278; F21K 9/64; F21K 9/272; F21V 21/088; F21V 13/04; F21V 19/02; F21V 19/0045; F21V 15/01; F21V 19/001; F21V 9/32; F21S 4/28; F21Y 2115/10; F21Y 2103/10; F21Y 2107/90
See application file for complete search history.

(56) References Cited

U.S. PATENT DOCUMENTS

2004/0007980 A1* 1/2004 Shibata ..................... F21K 9/27 313/634
2011/0216523 A1* 9/2011 Tong ......................... F21K 9/65 362/84
(Continued)

FOREIGN PATENT DOCUMENTS

CA 2434689 C * 9/2010 ................ F21S 4/28
CN 106030191 A * 10/2016 ............ F21K 9/272
(Continued)

OTHER PUBLICATIONS

English Language Machine Translation of WO2016/074886A1, Kirschner (Year: 2016).*
(Continued)

*Primary Examiner* — Zheng Song
*Assistant Examiner* — Glenn D. Zimmerman
(74) *Attorney, Agent, or Firm* — Hayes Soloway PC

(57) ABSTRACT

An illumination device having a housing extending in the longitudinal direction and a light engine with a leadframe and a plurality of semiconductor lighting elements is arranged on the leadframe. The housing has a clamping device and that the light engine is retained in the clamping device. The housing and the clamping device may be integrally formed.

23 Claims, 3 Drawing Sheets

(51) Int. Cl.
*F21V 21/088* (2006.01)
*F21Y 115/10* (2016.01)

(56) References Cited

U.S. PATENT DOCUMENTS

| | | | | |
|---|---|---|---|---|
| 2012/0008314 | A1* | 1/2012 | Simon | F21K 9/27 362/217.1 |
| 2013/0093359 | A1* | 4/2013 | Hsu | F21V 19/003 315/312 |
| 2013/0223057 | A1* | 8/2013 | Gassner | F21V 3/04 362/223 |
| 2013/0249396 | A1* | 9/2013 | Hafner | F21S 43/145 315/82 |
| 2014/0071667 | A1* | 3/2014 | Hayashi | F21V 21/005 362/218 |
| 2017/0051882 | A1* | 2/2017 | Engel | F21V 3/061 |
| 2017/0102114 | A1* | 4/2017 | Xiong | H05B 45/00 |
| 2017/0130906 | A1* | 5/2017 | Jiang | F21K 9/232 |
| 2017/0241611 | A1* | 8/2017 | Pan | F21S 43/26 |
| 2017/0370570 | A1* | 12/2017 | Keen | A01G 7/045 |
| 2018/0149351 | A1* | 5/2018 | Wallace | A47B 95/02 |

FOREIGN PATENT DOCUMENTS

| | | | | | |
|---|---|---|---|---|---|
| DE | 102017109853 | A1 | | 11/2018 | |
| EP | 18152566.8 | | | 1/2018 | |
| JP | 2006100800 | A | * | 4/2006 | |
| WO | WO-2015091462 | A1 | * | 6/2015 | F21S 45/40 |
| WO | WO-2016074886 | A1 | * | 5/2016 | F21S 4/22 |
| WO | WO-2016077058 | A1 | * | 5/2016 | F21V 29/503 |

OTHER PUBLICATIONS

Machine English Translation of JP2006-100800A, Kusube (Year: 2006).*

Wikipedia—Vertex (geometry). (Year: 2021).*

* cited by examiner

ILLUMINATION DEVICE WITH LEADFRAME

CROSS-REFERENCE TO RELATED APPLICATIONS AND PRIORITY

This patent application claims priority from DE Patent Application No. 202018105898.3 filed Oct. 16, 2018, which is herein incorporated by reference in its entirety.

TECHNICAL FIELD

The present invention relates to an illumination device, in particular an illumination device having semiconductor lighting elements.

PRIOR ART

Lamps and lights on the basis of LEDs are also becoming increasingly established in the field of tube lamps (for example as retrofit lamps) and light strips. In this case the light engine as well as the fastening thereof in the interior of the lamp or light proves to be a significant cost factor.

The expression "light engine" is usually used for the arrangement which comprises the LEDs and a mechanical structure which holds the LEDs and includes conductive tracks and/or wires for supplying the LEDs with electrical power from the driver.

For the light engine, many retrofit LED tube lamps use a printed circuit board on which the LEDs are fastened, for example soldered. Such printed circuit boards are usually produced by etching of a blank which has a copper coat arranged on an electrically non-conductive substrate. This results in a high consumption of copper and correspondingly high production costs and substantial environmental pollution. Also the circuit board material (for example FR4 or metal core-printed circuit board) causes high costs.

From the German patent application DE 10 2017 109 853.4, the disclosure of which is incorporated completely herein by reference, it is known to build the light engine of a retrofit tube lamp on a so-called wiring board. Wiring boards consist of strips of an electrically conductive material (for example aluminium), which is laminated between electrically insulating, flexible layers (for example polyimide). The required circuit design can then be achieved by stamping out of parts of the electrically conductive strips. The LEDs can be connected to the electrically conductive strips by openings in one of the electrically insulating layers. The production of wiring boards with all advantages relative to printed circuit boards is also elaborate and expensive.

Leadframes which can simultaneously provide the electrical connections and can ensure thorough heat dissipation have proved to be a good alternative for the mechanical structure of a light engine. The use of leadframes in tube lamps is described in European Patent Application EP 18152566, the disclosure of which is incorporated completely herein by reference.

Electrically conductive structures which are stamped or cut out of a sheet metal (for example by means of laser cutting or water jet cutting) and function without an electrically insulating substrate (such as a printed circuit board) or electrically insulating, flexible layers (such as wiring boards), are designated here as leadframes. For production of a leadframe the conductive tracks are stamped or cut out of a sheet, wherein transport strips and connection bars for stabilization of the stamped sheet remain for further processing. The transport strips and connection bars are removed at a later time, for example if the leadframe is sufficiently stabilised by electrical components fastened thereon.

The fastening of the semiconductor light elements takes place by a SMD soldering technique (SMD stands for "surface-mounted device"), in which the solder points of the stamped out sheet metal parts (conductive tracks) are provided with a soldering paste, then equipped with the semiconductor light elements and finally are heated by infrared radiation from a melting furnace so that the soldering paste melts. In this way the semiconductor light elements are connected to the conductive tracks.

The leadframe is a flat structure which has two opposing surfaces extending substantially parallel and spaced apart by the sheet thickness. The leadframe can be manufactured for example from a cost-effective material, such as for instance steel, or a material with high thermal conductivity, such as for instance copper, or a metal with an optically high grade appearance, such as for instance brass. The sheet thickness is preferably in the range from 0.1 mm to 2 mm, more preferably in the range from 0.2 mm to 0.8 mm. In particular materials which can be used for printed circuit boards (PCBs) are suitable. Moreover, the leadframe can be coated for example with a Sn, Zn, Au, Ag, Pt, Pd or Ni layer, and/or the surfaces of the leadframes can be partially or completely roughened. The surfaces of the leadframe can also be coated with a good reflecting coating, for example with a white or bright colour or lacquer layer (in particular solder resist).

Thus the production of a leadframe is simpler than that of a wiring board or a printed circuit board. The conductive structures can also be chosen more flexibly than in the case of a wiring board. The heat dissipation from the semiconductor light elements during operation is improved by the thermal conductivity of the metallic leadframes.

Within the context of the present disclosure "arranged on the leadframe" means that the corresponding component is fastened to the leadframe and is electrically connected to the leadframe.

However, there is a demand for a simple and cost-effective, but nevertheless stable type of holder of a leadframe in a lamp or light.

SUMMARY OF THE INVENTION

Starting from the known prior art, it is an object of the present invention to provide an improved illumination device.

This object is achieved by an illumination device with the features of the independent claim. Advantageous further embodiments are set out in the subordinate claims.

Accordingly an illumination device is proposed which has a housing extending in the longitudinal direction and a light engine with a leadframe and a plurality of semiconductor lighting elements arranged on the leadframe. In this case the longitudinal direction is understood to be the direction of the greatest expansion of the housing (length) which is significantly greater than (in particular a multiple of) the expansion in the two other directions (width and thickness).

In order to fix the light engine (i.e. in particular the leadframe) in the housing, the housing has a clamping device in which the light engine is retained. The retention of the light engine in the clamping device can take place by positive engagement and/or non-positive engagement (in particular frictionally).

For example, the clamping device can be configured as a U-shaped or rectangular groove in an inner side of the housing or on an element connected to the inner side of the housing. The light engine can be inserted into this groove. The groove can be formed over the entire length of the housing or also only in some sections.

The clamping device can also have a support surface formed on the entire length of the housing and a plurality of clamping lugs, so that the light engine is held at the locations of the clamping lugs by positive and/or non-positive engagement (in particular frictionally) between the support surface and the clamping lugs.

In one embodiment the housing and the clamping device are constructed integrally. This can simplify the production of the housing and the installation of the illumination device.

The housing can be made at least partially from a translucent or transparent material. As a result the light emitted by the semiconductor lighting elements during operation of the illumination device can leave the housing at least partially.

The housing can be made from a plastic material (for example polycarbonate PC, acrylonitrile-butadiene-styrene copolymer ABS, polyphenylene sulfide PPS, polybutylene terephthalate PBT, polymethyl methacrylate PMMA, polystyrene PS, polyamide PA, polyurethane PU, polyethylene PE, polypropylene PP, polyethylene terephthalate PET, etc.). In particular, the entire housing (possibly apart from closing elements at the two longitudinal ends) can be made from the same plastic material. Such a housing can be produced for example simply and cost-effectively by an extrusion process. In particular, if the housing and the clamping device are constructed integrally, this enables a cost-effective production of these elements.

The leadframe can be equipped on one or both sides with the semiconductor lighting elements.

In one embodiment the clamping device is designed to retain the light engine in the centre of the housing. This enables for example an emission of light to both sides of the light engine. Such a holder which increases the contact with the ambient air in both directions, can also improve the heat dissipation from the light engine.

In one embodiment the housing 3 has a cross-section in the form of an “8”. The clamping device can then be arranged in the centre of the “8”. In other words, starting from the clamping device there are an upper housing part and a lower housing part. The two housing parts can be substantially the same size. The two housing parts can in each case have a rounded (in particular a round, oval, egg-shaped, D-shaped, etc.) cross-section. As a result a uniform light distribution can be achieved. The two housing parts can also have, at least partially, a polygonal cross-section. The two housing parts can also have substantially the same cross-section or different cross-sections.

In one embodiment the illumination device also has a sleeve extending in the longitudinal direction, which rests at least partially on the outer face of the housing.

The sleeve can be made at least partially from a translucent or transparent material. As a result the light emitted by the semiconductor lighting elements during operation of the illumination device can leave the housing at least partially. The housing can be made from glass or from a plastic material (for example polycarbonate PC, polymethyl methacrylate PMMA, polystyrene PS, polyamide PA, cycloolefin (co)polymers COC, polyurethane PU, polyethylene PE, polypropylene PP, polyethylene terephthalate PET, etc.).

The sleeve can serve in particular for stabilization of the housing arranged in the interior of the sleeve. For example, the sleeve can be made from a rigid material, whilst the housing is made from a flexible material. Thus the housing can be produced for example from a more expensive material than the sleeve, so that a sufficient stability can be achieved at the same time as reduced material costs. For example, the housing together with the clamping device can be produced from (relatively expensive) polycarbonate in an extrusion process with a small wall thickness and the sleeve can be produced from (relatively inexpensive) glass, so that the necessary stability is given to the polycarbonate housing after insertion thereof into the glass sleeve.

The housing and/or the sleeve can be matt, in order to achieve a scattering of the light coming out of the housing/the sleeve and thus, on the one hand, to enable gentler illumination and, on the other hand, a direct view of (and thus blinding by) the individual semiconductor lighting elements.

The sleeve can surround the housing over the entire periphery. However, the sleeve can also be provided only in specific regions over the circumference of the housing. Moreover, the sleeve can be provided on the housing over the entire length or only over one or more longitudinal sections.

In one embodiment the housing has one or more stabilizing sections between a first housing part and a second housing part. The stabilizing sections can be formed integrally with the housing. The stabilizing sections can serve in particular for the structural reinforcement of the housing.

In one embodiment the housing has a fastening section extending in the longitudinal direction for fastening the housing to a holder. If the illumination device has a sleeve resting against the housing, alternatively or additionally the sleeve can also have a fastening section extending in the longitudinal direction. When reference is made below to a fastening section of the housing, this also applies correspondingly to a fastening section of the sleeve.

The fastening section can be produced for example by a corresponding shaping of the housing. The fastening section can be for example a section of the housing with a trapezoidal cross-section, with which the housing can be inserted into a holder. The fastening section can also be formed by a groove in the outer side of the housing, in which a holder can engage.

The semiconductor lighting elements can be configured to emit white light. This can be achieved for example by a conversion material applied directly to the semiconductor lighting elements for conversion of the light (for example blue) emitted by the semiconductor lighting elements into light of other wavelengths (for example yellow). The mixture of the converted proportion of the emitted light and the unconverted proportion of the emitted light can then appear as white light.

The conversion material can also be applied to the housing or the sleeve, so that the wavelength conversion only takes place when leaving the housing or the sleeve. This reduces the thermal stress on the conversion material. Moreover, the conversion material can also perform the role of the above-mentioned matting for improved scattering of light.

The illumination device can be constructed as a lamp (for example a tube lamp), which can be inserted into a corresponding socket of a light, or directly as a light (for example light strip).

In particular if the illumination device is constructed as a tube lamp, it can also have two end caps at the two ends of the housing, wherein the end caps are designed for holding the illumination device in a socket for tube lamps.

Instead of a leadframe the light engine can also have a printed circuit board (in particular a CEM, FR4, Rigid Flex or metal core printed circuit board) or a wiring board which is retained in the housing by means of the clamping device.

BRIEF DESCRIPTION OF THE DRAWINGS

Preferred further embodiments of the invention are explained in greater detail by the following description of the drawings. The drawings show.

DETAILED DESCRIPTION OF PREFERRED EXEMPLARY EMBODIMENTS

Figure 1:
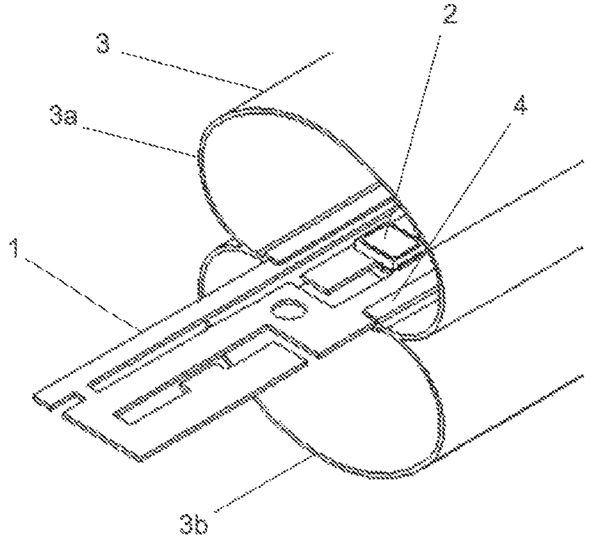
FIG. 1 shows a first embodiment of an illumination device in perspective view according to the invention.

Preferred exemplary embodiments are described below with reference to the drawings. In this case elements which are the same, similar, or act in the same way are provided with identical reference numerals in the different drawings, and repeated description of some of these elements is omitted in order to avoid redundancies.

Figure 2:
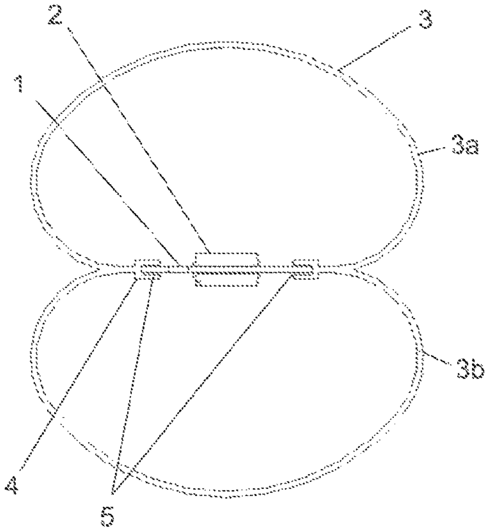
FIG. 2 shows the sensor according to FIG. 1 in cross-section.

A first embodiment of an illumination device according to the invention is shown schematically in perspective view in FIG. 1. FIG. 2 shows this embodiment in cross-section. The illumination device has a light engine with a leadframe 1 and a plurality of LEDs 2 arranged on the leadframe. The LEDs 2 are arranged on both sides of the leadframe 1. As a result an omnidirectional light emission is achieved. However, in another embodiment the LEDs 2 can also be arranged only on one of the sides of the leadframe 1 (for example only on the upper side or only on the lower side).

Furthermore, the lighting device has a housing 3. The housing 3 has a cross-section in the form of an "8". In other words the housing has an upper housing part 3*a* and a lower housing part 3*b*. The two housing parts 3*a*, 3*b* are connected to one another in the region of a clamping device 4. Both housing parts 3*a*, 3*b* have substantially the same shape, so that the housing is substantially in mirror symmetry with a plane which contains the connection region between the two housing parts 3*a*, 3*b*. Both housing parts 3*a*, 3*b* have a substantially rounded shape.

The clamping device 4 is configured as two opposing grooves 5, being constructed on the inner end of the connection regions between the two housing parts 3*a*, 3*b*, and thus can likewise be regarded as part of the connection regions. The groove 5 extends in the longitudinal direction substantially over the entire length of the housing 3. The leadframe 1 is inserted into the groove 5 and is retained there by clamping. This effects a non-positively engaged retention of the light engine in the longitudinal direction, as well as a positively engaged retention in the two directions perpendicular to the longitudinal direction.

The housing 3 is produced from a plastic material such as polycarbonate. The wall thickness of the housing 3 is dimensioned so that the housing has sufficient stability and in particular does not sag significantly if the illumination device as lamp is mounted at its two ends in a corresponding socket of a light. The wall thickness of the housing 3 can be between approximately 0.2 mm and approximately 2 mm, preferably approximately 0.6 mm.

The housing 3 can be matt in order to cause a scattering of the light emitted by the illumination device.

Figure 3:
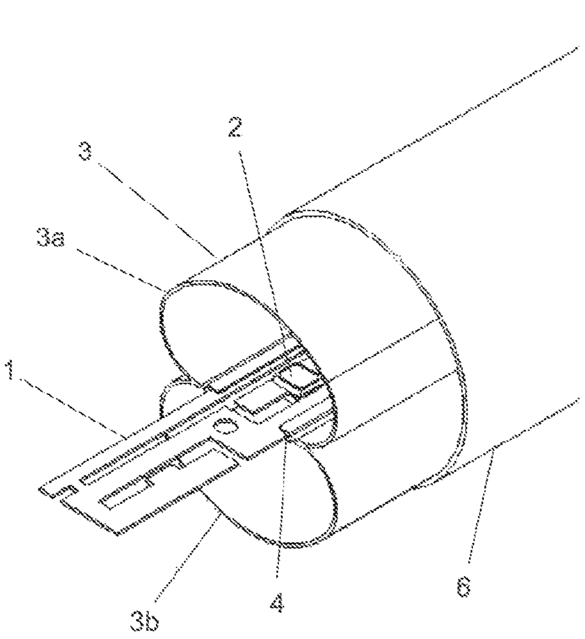
FIG. 3 shows a second embodiment of an illumination device in perspective view according to the invention.
Figure 4:
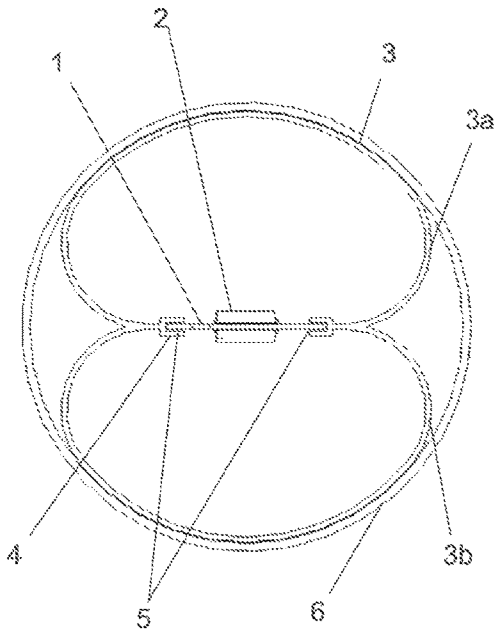
FIG. 4 shows the sensor according to FIG. 3 in cross-section.

A first embodiment of an illumination device according to the invention is shown schematically in perspective view in FIG. 3. FIG. 4 shows this embodiment in cross-section.

The illumination device shown in FIG. 3 and FIG. 4 corresponds for the most part to the illumination device shown in FIG. 1 and FIG. 2. Here too the light engine comprises LEDs 2 which are arranged on both sides of the leadframe 1. As a result an omnidirectional light emission is achieved. However, the LEDs 2 can also be arranged only on one side of the leadframe 1.

Furthermore, the illumination device shown in FIG. 3 and FIG. 4 differs from the illumination device shown in FIG. 1 and FIG. 2 by a sleeve 6 which surrounds the housing 3 and rests against the housing 3. The sleeve 6 can be made from glass and gives the lighting device sufficient stability so that it does not sag significantly if the illumination device as lamp is mounted at its two ends in a corresponding socket of a light. As a result the wall thickness of the housing 3 can be significantly reduced. The wall thickness of the sleeve 6 can be between approximately 0.2 mm and approximately 2 mm, preferably approximately 0.6 mm.

The sleeve 6 can be matt in order to cause a scattering of the light emitted by the illumination device. The housing 3 can then be transparent.

Figure 5:
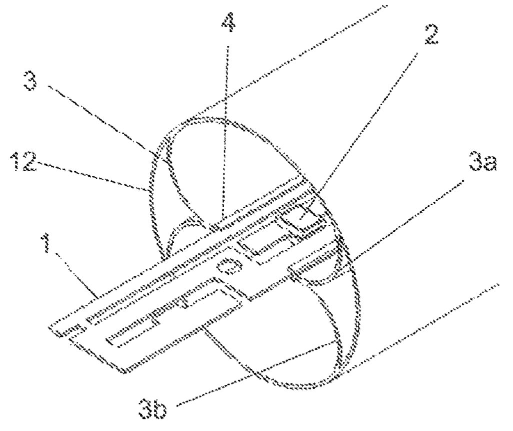
FIG. 5 shows a third embodiment of an illumination device according to the invention in perspective view.
Figure 6:
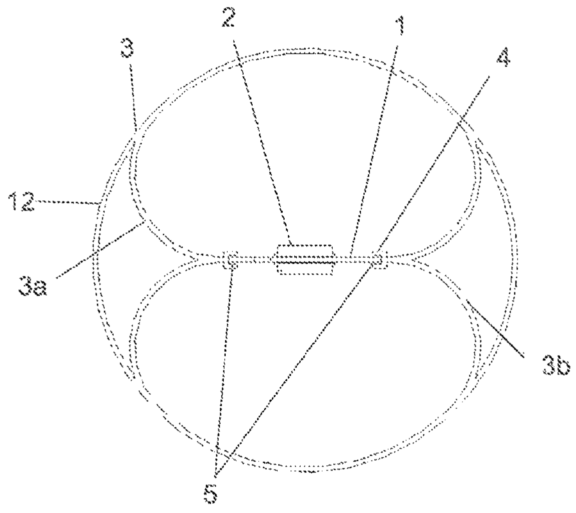
FIG. 6 shows the sensor according to FIG. 5 in cross-section.

A third embodiment of an illumination device according to the invention is shown schematically in perspective view in FIG. 5. FIG. 6 shows this embodiment in cross-section.

The illumination device shown in FIG. 5 and FIG. 6 corresponds for the most part to the illumination device shown in FIG. 1 to FIG. 4. Here too the light engine comprises LEDs 2 which are arranged on both sides of the leadframe 1. As a result an omnidirectional light emission is achieved. However, the LEDs 2 can also be arranged only on one side of the leadframe 1.

In contrast to the embodiments described above, the housing 3 here has additional stabilizing sections 12, which can be formed integrally with the housing 3. The stabilizing sections 12 here are formed in the regions where in the embodiment according to FIG. 3 and FIG. 4 the housing 3 does not rest against the inner side of the sleeve 6. In this case the stabilizing sections 12 effect a stabilization of the housing, so that the illumination device does not sag significantly if as lamp it is mounted at its two ends in a corresponding socket of a light. The wall thickness of the housing 3 and stabilizing sections 12 can be between approximately 0.2 mm and approximately 2 mm, preferably approximately 0.6 mm. All sections of the housing 3 (including the stabilizing sections 12) can be designed with the same thickness. Alternatively, some sections of the housing can be thicker or thinner than other sections of the housing.

Such a housing 3 including stabilizing sections 12 can be made from plastic and can for example be produced by means of an extrusion process. The housing 3 of the illumination device shown in FIG. 1 to FIG. 4 can also be produced for example by means of an extrusion process.

Figure 7:
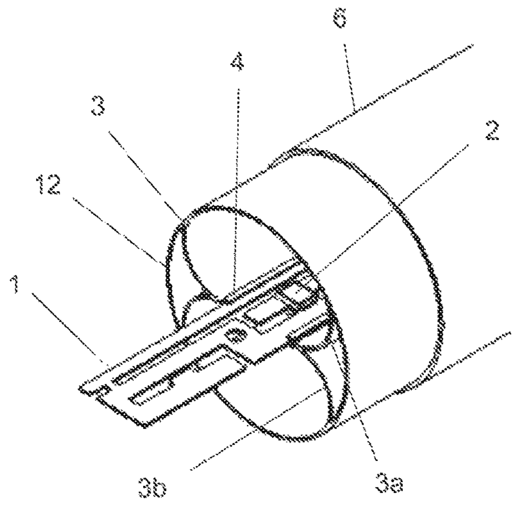
FIG. 7 shows a fourth embodiment of an illumination device according to the invention in perspective view.
Figure 8:
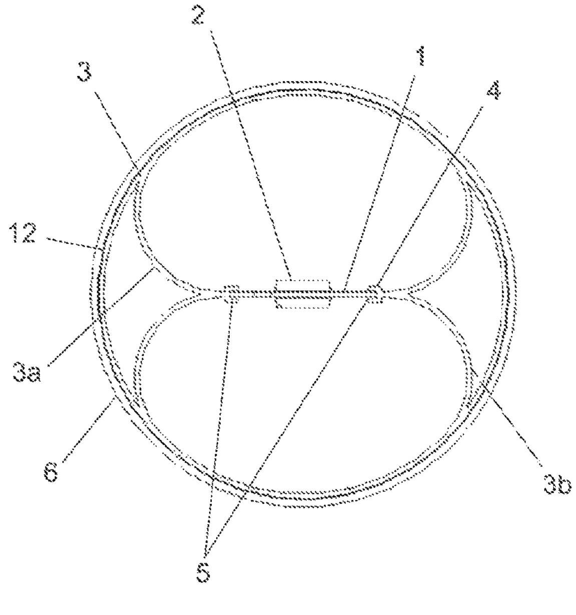
FIG. 8 shows the sensor according to FIG. 7 in cross-section.

The illumination device shown in FIG. 5 and FIG. 6 can also be additionally provided with a sleeve 6 which surrounds the housing 3 and rests against the housing 3 or against the stabilizing sections 12. Such a fourth embodiment of an illumination device is illustrated schematically in perspective view in FIG. 7. FIG. 8 shows this embodiment in cross-section.

The sleeve 6 can be made from glass and gives the lighting device an improved stability, so that it does not sag significantly if the illumination device as lamp is mounted at its two ends in a corresponding socket of a light. As a result the wall thickness of the housing 3 can be significantly reduced. The wall thickness of the sleeve 6 can be between approximately 0.2 mm and approximately 2 mm, preferably approximately 0.6 mm.

Figure 9:
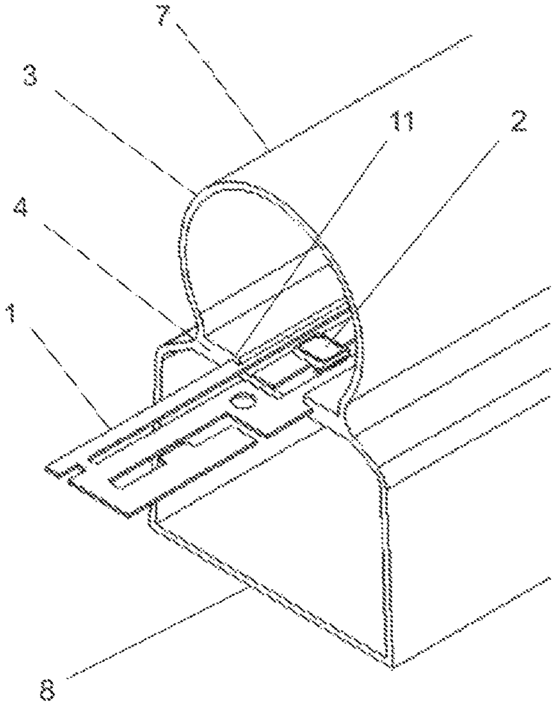
FIG. 9 shows a fifth embodiment of an illumination device according to the invention in perspective view.
Figure 10:
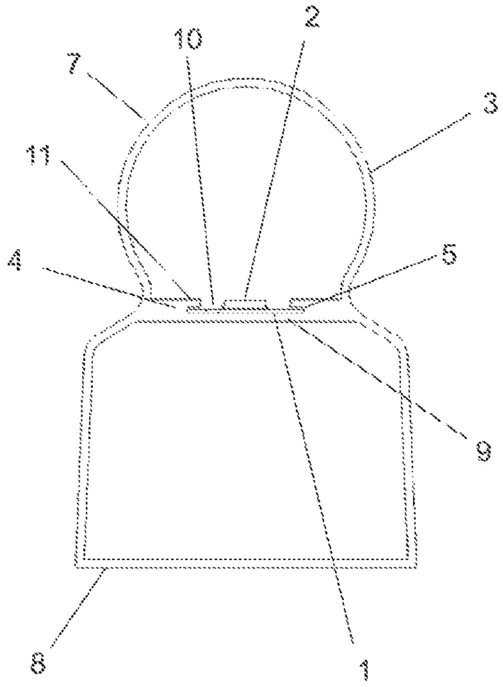
FIG. 10 shows the sensor according to FIG. 9 in cross-section.

A fifth embodiment of an illumination device according to the invention is shown schematically in perspective view in FIG. 9. FIG. 10 shows this embodiment in cross-section. The illumination device has a light engine with a leadframe 1 and a plurality of LEDs 2 arranged on the leadframe. The LEDs 2 are arranged only on one side (in this case on the upper side) of the leadframe 1.

Furthermore, the lighting device has a housing 3. The housing 3 has an illumination section 7 and a fastening section 8 which merge into one another at a connection region. A partition wall 9 is provided between the illumination section 7 and the fastening section 8. The illumination section 7 (apart from the connection region) is round in cross-section and almost circular. The fastening section 8 is (apart from the connection region) designed as a trapezoid in cross-section, that is to say the width of the fastening section 8 tapers towards in the direction of the illumination section 7. With the fastening section 8 the illumination device can be inserted into a holder (not shown) for installation.

The partition wall 9 has a depression 10 on the side of the illumination section 7 which serves as support for the leadframe 1 of the light engine and, together with two projections 11 on the edge of the depression 10, forms a clamping device 4 by which the leadframe is held and clamped. In other words, at the edge of the depression there are two opposing grooves 5, into which the leadframe 1 can be inserted. This effects a non-positively engaged retention of the light engine in the longitudinal direction, as well as a positively engaged retention in the two directions perpendicular to the longitudinal direction. The depression 10 extends in the longitudinal direction substantially over the entire length of the housing 3. The projections 11 can extend in the longitudinal direction substantially over the entire length of the housing 3. However, they can also be formed only in part-regions.

The housing 3 is produced from a plastic material such as polycarbonate and can be produced for example by means of an extrusion process. The wall thickness of the housing 3 is dimensioned so that the housing has sufficient stability and in particular does not sag significantly if the illumination device as light is mounted on holders which are spaced apart from one another. The wall thickness of the housing 3 can be between approximately 0.2 mm and approximately 2 mm, preferably approximately 0.6 mm.

Although the invention has been illustrated and described in greater detail by the depicted exemplary embodiments, the invention is not restricted thereto and other variations can be deduced therefrom by the person skilled in the art without departing from the scope of protection of the invention.

In general "a" or "an" may be understood as a single number or a plurality, in particular in the context of "at least one" or "one or more" etc., provided that this is not explicitly precluded, for example by the expression "precisely one" etc.

Also, when a number is given this may encompass precisely the stated number and also a conventional tolerance range, provided that this is not explicitly ruled out.

If applicable, all individual features which are set out in the exemplary embodiments can be combined with one another and/or exchanged for one another, without departing from the scope of the invention.

LIST OF REFERENCES

1 leadframe
2 LEDs
3 housing
3*a*, 3*b* housing parts
4 clamping device
5 grooves
6 sleeve
7 illumination section
8 fastening section
9 partition wall
10 depression
11 projections
12 stabilizing sections

The invention claimed is:

1. An illumination device comprising:
- a housing extending in a longitudinal direction and comprising:
  - a first housing part;
  - a second housing part adjacent the first housing part; and
  - a clamping device;
  - wherein the first housing part, the second housing part, and the clamping device are constructed integrally as a flexible one-piece body, wherein the first housing part and the second housing part are not separable from one another without destroying the housing; and
- a light engine encircled by the housing and retained by the clamping device, the light engine comprising:
  - a leadframe constructed from an electrically conductive metal and configured to function without any electrically insulating substrate or electrically insulating, flexible layers; and
  - a plurality of semiconductor lighting elements arranged directly on at least one side of the leadframe such that the semiconductor lighting elements are fastened directly to the leadframe and electrically connected to the leadframe;
- wherein the clamping device is configured as two opposing grooves into which the leadframe is inserted, wherein the two opposing grooves effectuate:
  - a non-positively engaged retention of the light engine in the longitudinal direction; and
  - a positively engaged retention of the light engine in two other directions perpendicular to the longitudinal direction.

2. The illumination device according to claim 1, wherein the housing is made at least partially from at least one of:
- a translucent or transparent material; and
- a plastic material.

3. The illumination device according to claim 1, wherein the housing has a cross-section in the form of a figure eight.

4. The illumination device according to claim 1, wherein the housing has a fastening section extending in the longitudinal direction and configured for fastening the housing to a holder.

5. The illumination device according to claim 1, wherein the housing has a conversion material configured for converting light emitted by the plurality of semiconductor lighting elements into light of one or more other wavelengths.

6. The illumination device according to claim 1, further comprising two end caps at ends of the housing, wherein the two end caps are configured for holding the illumination device in a socket for tube lamps.

7. The illumination device according to claim 1, wherein:
the first housing part has a rounded cross-section;
the second housing part has a rounded cross-section; and
the first housing part and the second housing part are of the same rounded cross-section configuration.

8. The illumination device according to claim 1, wherein:
the first housing part has a rounded cross-section;
the second housing part has a rounded cross-section; and
the first housing part and the second housing part are of dissimilar rounded cross-section configuration.

9. The illumination device according to claim 1, wherein:
the first housing part has a polygonal cross-section;
the second housing part has a polygonal cross-section; and
the first housing part and the second housing part are of the same polygonal cross-section configuration.

10. The illumination device according to claim 1, wherein:
the first housing part has a polygonal cross-section;
the second housing part has a polygonal cross-section; and
the first housing part and the second housing part are of dissimilar polygonal cross-section configuration.

11. The illumination device according to claim 1, wherein the housing has one or more stabilizing sections extending between the first housing part and the second housing part, wherein the first housing part, the second housing part, the clamping device, and the one or more stabilizing sections are constructed integrally as a one-piece body.

12. The illumination device according to claim 1, wherein:
the two opposing grooves each have a U-shaped or rectangular cross-section; and
the two opposing grooves extend in the longitudinal direction over only a portion of an entire length of the housing.

13. The illumination device according to claim 1, wherein:
the two opposing grooves each have a U-shaped or rectangular cross-section; and
the two opposing grooves extend in the longitudinal direction substantially over an entire length of the housing.

14. The illumination device according to claim 1, wherein at least one of the two opposing grooves is situated radially inward from a vertex formed by a structural merging of the first housing part and the second housing part, wherein the vertex extends radially inward into an interior of the housing.

15. The illumination device according to claim 1, wherein the clamping device further comprises:
a support surface formed on at least a portion of the housing; and
a plurality of clamping lugs configured to hold the light engine at locations of the clamping lugs by engagement between the support surface and the clamping lugs.

16. The illumination device according to claim 1, wherein the leadframe has a sheet thickness in the range of 0.1-2 mm.

17. The illumination device according to claim 3, further comprising a sleeve extending in the longitudinal direction and resting at least partially on an outer face of the housing.

18. The illumination device according to claim 14, wherein the at least one of the two opposing grooves is situated at an endpoint of the vertex.

19. The illumination device according to claim 17, wherein the sleeve at least one of:
is made from glass; and
has a conversion material for converting light emitted by the plurality of semiconductor lighting elements into light of one or more other wavelengths.

20. The illumination device according to claim 17, wherein the housing has one or more stabilizing sections extending between the first housing part and the second housing part, wherein the one or more stabilizing sections are provided in one or more regions where the sleeve does not at least partially rest against the outer face of the housing.

21. The illumination device according to claim 17, wherein:
the housing has a wall thickness in the range of 0.2-2 mm; and
the sleeve has a wall thickness in the range of 0.2-2 mm.

22. An illumination device comprising:
a housing extending in a longitudinal direction and having a cross-section in the form of a figure eight, the housing comprising:
a first housing part having a rounded cross-section;
a second housing part having a rounded cross-section and situated adjacent the first housing part; and
a clamping device situated at an endpoint of a vertex formed by a merging of the first housing part and the second housing part, wherein the clamping device is configured as two opposing grooves;
wherein the first housing part, the second housing part, and the clamping device are constructed integrally as a flexible one-piece body, wherein the first housing part and the second housing part are not separable from one another without destroying the housing; and
a light engine disposed within the housing and retained by the clamping device, the light engine comprising:
a leadframe constructed from an electrically conductive metal and configured to function without any electrically insulating substrate or electrically insulating, flexible layers; and
a plurality of semiconductor lighting elements arranged directly on at least one side of the leadframe such that the semiconductor lighting elements are fastened directly to the leadframe and electrically connected to the leadframe;
wherein the leadframe is inserted into the two opposing grooves, wherein the two opposing grooves effectuate:
a non-positively engaged retention of the light engine in the longitudinal direction; and
a positively engaged retention of the light engine in two other directions perpendicular to the longitudinal direction.

23. The illumination device of claim 22, further comprising a sleeve extending in the longitudinal direction and encircling the housing, wherein the sleeve rests at least partially on an outer face of the housing, and wherein the sleeve has a cross-section in the form of a circle or ellipse.

* * * * *